(12) United States Patent
Ramnath Krishnan et al.

(10) Patent No.: US 9,996,628 B2
(45) Date of Patent: Jun. 12, 2018

(54) PROVIDING AUDIO-ACTIVATED RESOURCE ACCESS FOR USER DEVICES BASED ON SPEAKER VOICEPRINT

(75) Inventors: Harshini Ramnath Krishnan, Sunnyvale, CA (US); Andrew Fregly, Reston, VA (US)

(73) Assignee: VERISIGN, INC., Reston, VA (US)

( * ) Notice: Subject to any disclaimer, the term of this patent is extended or adjusted under 35 U.S.C. 154(b) by 618 days.

(21) Appl. No.: 13/538,581

(22) Filed: Jun. 29, 2012

(65) Prior Publication Data

US 2014/0006025 A1   Jan. 2, 2014

(51) Int. Cl.
G10L 21/00 (2013.01)
G06F 17/30 (2006.01)
G10L 17/00 (2013.01)

(52) U.S. Cl.
CPC ........ G06F 17/30876 (2013.01); G10L 17/00 (2013.01); *H04M 2201/40* (2013.01)

(58) Field of Classification Search
CPC ......... G06F 17/30876; G06F 17/30026; G06F 17/30041; G06F 17/30047; G10L 13/043; G10L 15/26; G10L 17/00; G10L 2015/088
USPC ..................... 704/246, 235, 270.1
See application file for complete search history.

(56) References Cited

U.S. PATENT DOCUMENTS

| | | | | |
|---|---|---|---|---|
| 5,165,095 A | * | 11/1992 | Borcherding | 379/88.03 |
| 5,632,002 A | * | 5/1997 | Hashimoto et al. | 704/231 |
| 5,987,106 A | * | 11/1999 | Kitamura | H04L 12/2803 |
| | | | | 379/102.02 |
| 6,246,987 B1 | * | 6/2001 | Fisher | H04M 3/42204 |
| | | | | 704/247 |
| 6,317,710 B1 | * | 11/2001 | Huang et al. | 704/246 |
| 6,424,946 B1 | * | 7/2002 | Tritschler | G06F 17/3074 |
| | | | | 704/251 |
| 6,477,491 B1 | * | 11/2002 | Chandler et al. | 704/235 |
| 6,748,356 B1 | * | 6/2004 | Beigi | G10L 17/04 |
| | | | | 704/245 |
| 6,965,665 B2 | * | 11/2005 | Fan | H04M 3/493 |
| | | | | 379/88.16 |
| 7,334,078 B2 | | 2/2008 | Parry et al. | |

(Continued)

OTHER PUBLICATIONS

Extended European Search Report dated Jan. 2, 2014 from European Patent Application No. 13173232.3, filed Jun. 21, 2013, pp. 1-8.

(Continued)

*Primary Examiner* — Abdelali Serrou
(74) *Attorney, Agent, or Firm* — MH2 Technology Law Group, LLP (57) ABSTRACT

This disclosure includes, for example, methods and computer systems for providing audio-activated resource access for user devices. The computer systems may store instructions to cause the processor to perform operations, comprising capturing audio at a user device. The operations may also comprise using a speaker recognition system to identify a speaker in the transmitted audio and/or using a speech-to-text converter to identify text in the captured audio. The speaker identity or a condensed version of the speaker identity or other metadata along with the speaker identity may be transmitted to a server system to determine a corresponding speaker identity entry. The operations may also comprise receiving a resource corresponding to the identified speaker entry in the server system.

19 Claims, 4 Drawing Sheets

(56) References Cited

U.S. PATENT DOCUMENTS

| | | | | |
|---|---|---|---|---|
| 7,379,552 | B2* | 5/2008 | Neervoort | H04S 7/303 381/105 |
| 7,536,304 | B2* | 5/2009 | Di Mambro | G06F 21/32 704/270 |
| 7,620,547 | B2* | 11/2009 | Kompe | G10L 15/065 704/243 |
| 7,774,132 | B2* | 8/2010 | DeGrazia | G01C 21/20 340/988 |
| 7,792,870 | B2* | 9/2010 | Field | G06F 17/3087 707/802 |
| 8,065,152 | B2 | 11/2011 | Ambler | |
| 8,238,540 | B1* | 8/2012 | Duva | H04M 3/51 379/265.01 |
| 8,667,051 | B2 | 3/2014 | Schneider | |
| 9,571,652 | B1* | 2/2017 | Zeppenfeld | H04M 3/523 |
| 9,721,215 | B2* | 8/2017 | O'Sullivan | G06Q 10/02 |
| 2004/0088162 | A1* | 5/2004 | He | G10L 15/063 704/235 |
| 2005/0135583 | A1* | 6/2005 | Kardos | H04M 3/56 379/142.01 |
| 2006/0259302 | A1* | 11/2006 | Lewis et al. | 704/255 |
| 2007/0055530 | A1* | 3/2007 | Onishi | G10L 17/04 704/275 |
| 2007/0203901 | A1* | 8/2007 | Prado | G06Q 30/02 |
| 2007/0208934 | A1* | 9/2007 | Heffez | H04L 63/107 713/161 |
| 2009/0122198 | A1* | 5/2009 | Thorn | G06K 9/00221 348/715 |
| 2009/0222891 | A1* | 9/2009 | Heffez | H04L 63/08 726/3 |
| 2010/0223143 | A1 | 9/2010 | Lee | |
| 2011/0093266 | A1 | 4/2011 | Tham | |
| 2013/0246381 | A1* | 9/2013 | Garg | G06F 17/3087 707/706 |

OTHER PUBLICATIONS

Stolcke, A. et al. Speech Recognition as Feature Extraction for Speaker Recognition. 2007 IEEE Workshop on Signal Processing Applications for Public Security and Forensics, Jan. 1, 2007, pp. 1-5.

* cited by examiner

PROVIDING AUDIO-ACTIVATED RESOURCE ACCESS FOR USER DEVICES BASED ON SPEAKER VOICEPRINT

TECHNICAL FIELD

The techniques described herein relate to, for example, providing audio-activated resource access for user devices based on speaker voiceprint.

BACKGROUND

Personal electronic user devices ("user devices") such as, for example, smart phones, are ubiquitous in today's society due to the capabilities they provide, advancements in technology, improvements in communications and data networks, the availability and accessibility of various resources, and decreased costs. As a result, the use of such devices continues to increase significantly. In an attempt to provide an enhanced user experience, various technologies have been developed and evolved for use with user devices to direct users to specific content or retrieve content and applications ("resources") quickly and easily. For example, printed labeling or advertising may include two-dimensional images (e.g., Universal Product Code (UPC)) or matrix barcodes (e.g., QR Codes) that when read by video input to the user device and then converted to reveal the information encoded in the image, cause a web browser executing on the user device to be directed to a webpage. Such barcodes may be associated with a product and may include, for example, a Uniform Resource Locator (URL) that, when read by a user device, prompts a web browser application to retrieve related information from the URL or access product information from a webpage identified by the URL.

In some kinds of communication media, such as, television or other video presentation, it may be difficult or impractical to encode information within bar codes or other optical patterns for scanning because the clarity or resolution necessary for decoding such patterns may be lacking. Moreover, such optical techniques are not applicable to non-visual communication media, such as radio or other audio or signal media. However, the recent increases in capability of user devices allow for automated identification of information and entities based on processing of non-visual communications received by a user device. This information can then be used by a user device in a variety of ways including the retrieval or activation of resources.

SUMMARY

Methods and computer systems for providing audio-activated resource access for user devices are provided.

In one embodiment, a computer system for providing audio-activated resource access for user devices is disclosed. The computer may comprise a processor and a memory coupled to the processor. The memory may store instructions to cause the processor to perform operations. The operations may comprise one or more of the following: capturing audio at a user device, transmitting an identifier of a speaker of the captured audio identified by a speaker recognition system to a server system to determine a corresponding speaker entry, and receiving a resource corresponding to the speaker entry.

In another embodiment, a system for providing audio-activated resource access for user devices is disclosed. The system may comprise a processor and a memory coupled to the processor. The memory may store instructions to cause the processor to perform operations. The operations may comprise one or more of the following: receiving a request from a first device to register a speaker-resource pairing, registering the pairing in a database, receiving a request from a second device for a resource corresponding to at least one speaker included in the request from the second device, determining whether a speaker-resource pairing exists in the database based on the at least one speaker, and transmitting at least one resource to the second device.

In another embodiment, a method for providing audio-activated resource access for user devices is disclosed. The method may comprise one or more of the following: capturing audio at a user device, transmitting an identifier of a speaker of the captured audio identified by a speaker recognition system to a server system to determine a corresponding speaker entry, and receiving a resource corresponding to the speaker entry.

In another embodiment, a method for providing audio-activated resource access for user devices is disclosed. The method may comprise one or more of the following: receiving a request from a first device to register a speaker resource pairing, registering the pairing in a database, receiving a request from a second device for a resource corresponding to at least one speaker included in the request from the second device, determining whether a speaker-resource pairing exists in the database based on the at least one speaker, and transmitting at least one resource to the second device.

In another embodiment, a non-transitory computer-readable medium is disclosed which may store a set of instructions that, when executed by a processor, perform one or more of the preceding methods for providing audio-activated resource access for user devices.

BRIEF DESCRIPTION OF THE DRAWINGS

The accompanying drawings, which are incorporated in and constitute a part of this specification, illustrate various embodiments of the techniques, as described herein, and together with the description, serve to explain the principles of the techniques. In the drawings.

DETAILED DESCRIPTION

Described below are exemplary techniques for providing audio-activated resource access for user devices. Certain embodiments of the techniques described herein may enable a user to access resources that are associated with an identified speaker or a speaker voiceprint identified in an audio stream received at a user device. In a particular embodiment, a voiceprint match may be determined by first utilizing a speaker identification software to identify voiceprint in an audio stream received as input to a user device. A central database containing pre-registered speaker identity to resource pairings may then be queried to determine whether a speaker identity to resource pairing corresponding to the identified speaker exists. The speaker may be identified by a name, number, voiceprint, or any other identifier. Based on the determination, one or more resources may be communicated to the user device for access by the user.

Embodiments of the disclosed techniques may provide a variety of benefits and features such as, for example, improved user experience, seamless navigation to a resource relevant to content consumed by a user, and improved marketing and advertising, among many others. Moreover, the use of speaker recognition software in accordance with embodiments of the techniques disclosed herein facilitates resource access without needing to perform audio encoding or other audio manipulations on the audio stream.

Reference will now be made to the accompanying figures. Wherever possible, the same reference numbers will be used throughout the figures and the following description to refer to the same or similar parts. While several embodiments and features of the techniques are described herein, modifications, adaptations, and other implementations are possible, without departing from the spirit and scope of the techniques. For example, substitutions, additions or modifications may be made to the components illustrated in the figures, and the methods described herein may be modified by substituting, reordering, or adding steps to the disclosed methods. Accordingly, the following detailed description is not intended to limit the techniques to any specific embodiments or examples.

Figure 1:
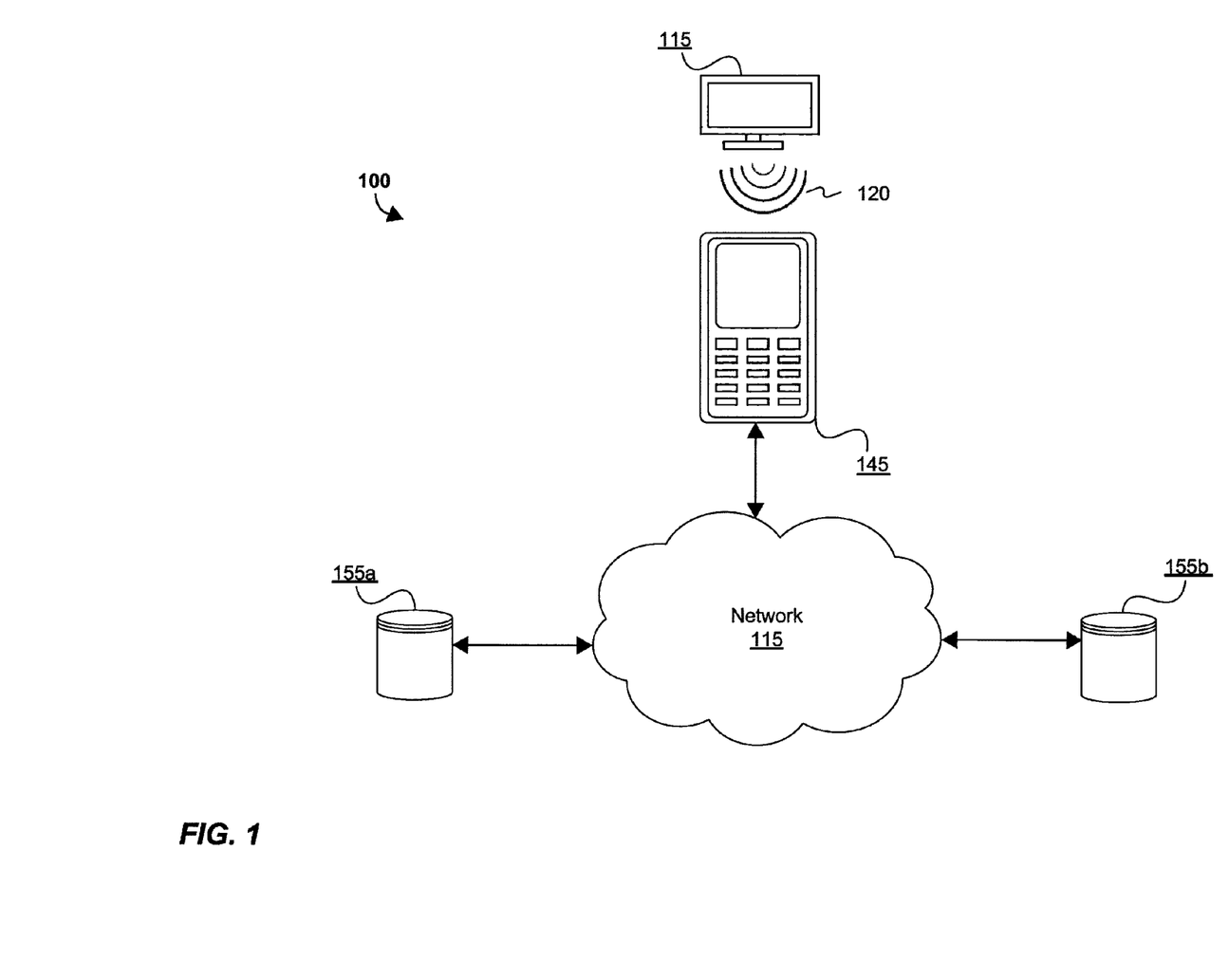
FIG. 1 illustrates a system that may be used with certain embodiments of the techniques to provide resources based on an identified speaker.

FIG. 1 illustrates a system that may be used for providing audio-activated resource access for user devices based on speaker voiceprint. As shown in the embodiment of FIG. 1, an audio stream 120 may be transmitted in connection with a television broadcast. Although a television broadcast is disclosed in the embodiment of FIG. 1, the techniques disclosed herein are applicable to any audio stream originating from any source such as, for example, radio audio, internet streaming audio, live human speech, prerecorded audio, or other human-perceptible and/or human-comprehensible audio. As specific examples, the techniques disclosed herein may be applicable to audio streams that originate from television or radio commercials, recorded or live music, patrons at a sales kiosk, and an information terminal (e.g., airport flight arrival and departure information terminal). The audio streams may be generated and received in various locations as well, including, for example, private locations such as a user's living room, and public locations such as a shopping mall or other large public areas.

Also shown in FIG. 1 are data repositories 155a and 155b, and a user device 145, all of which may be communicatively connected with one another and/or other components not shown in FIG. 1, via a network 115. In some embodiments, network 115 may be, include, or be part of any one or more of a variety of networks or other types of communication connections as known to those skilled in the art. For example, network 115 may be the Internet, an intranet network, a local area network, or other wireless or other hardwired connection or connections by which data repositories 155a and 155b, and user device 145 may communicate.

In certain embodiments, data repositories 155a and 155b may be, include, or be part of any logical and/or physical storage solution that retains digital data. For example, data repositories 155a and 155b may be data storage devices for storing data. As specific examples, data repositories 155a and 155b may be volatile or non-volatile, magnetic, semiconductor, tape, optical, removable, non-removable, or other types of storage or computer-readable media. In these embodiments, data repositories 155a and 155b may store one or more files and/or databases that may be accessed, used, and/or managed by a server (not shown) or user device 145. Data repositories 155a and 155b may include, for example, speaker identity and/or associated resources, as explained further below. In some embodiments, data repositories 155a and 155b may be, or be communicatively connected to, a proprietary or third-party resolution server responsive to, for example, requests for resources.

User device 145 may be, include, or be part of any electronic device or system. For example, user device 145 may be a television, radio, mobile phone, smart phone, television, ebook reader, personal computer, or other devices capable of capturing audio. In some embodiments, user device 145 may have been equipped for audio capture when user device 145 was manufactured. In other embodiments, user device 145 may require an additional device or functionality be added to enable audio capture. In another embodiment, user device 145 may capture the audio directly from a received audio signal. User device 145 may, in some embodiments, be running an operating system and/or proprietary or third-party applications or logic. For example, user device 145 may include software-implemented speaker identification system useful for performing the techniques described herein. In some embodiments, the speaker identification system may be, or be part of, an application, such as, for example, a mobile application on a smart phone, which performs the techniques described herein.

Figure 2:
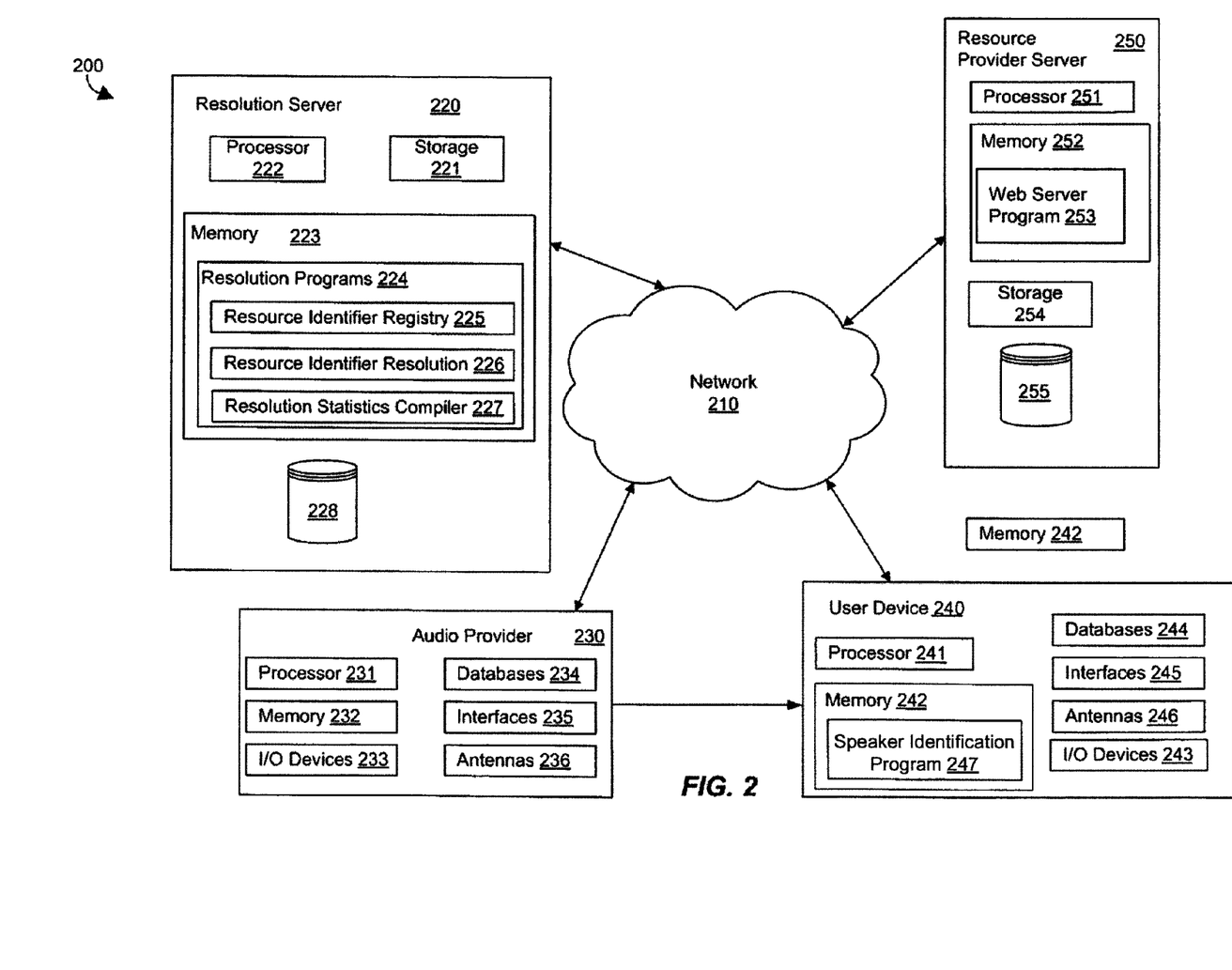
FIG. 2 illustrates a system that may be used with certain embodiments of the techniques to provide resources base on an identified speaker.

Referring now to FIG. 2, shown is a system 200, which may be used to implement embodiments of the techniques described herein. As shown, system 200 includes a network 210, a resolution server 220, an audio provider 230, a resource provider server 250, and a user device 240. In some embodiments, resolution server 220 may include storage 221, a processor 222, memory 223, input/output (I/O) devices (not shown), and a data repository 228. Resolution server 220 may be implemented in various ways. For example, resolution server 220 may be a general purpose computer, a server, a mainframe computer, or any combination of these components. Resolution server 220 may communicate with other components shown and not shown in system 200 via network 210. Resolution server 220 may be standalone or it may be part of a subsystem, which may, in turn, be part of a larger system, such as a legacy domain registration system.

Storage 221 may be, include, or be part of one or more storage devices configured to store information used by processor 222 to perform certain functions related to the disclosed techniques. For example, storage 221 may include a volatile or non-volatile, magnetic, semiconductor, tape, optical, removable, non-removable, or other type of storage device or computer-readable media. In one embodiment, memory 223 may include one or more resolution programs or subprograms 224 loaded from storage 221 or elsewhere that, when executed by processor 222, perform various procedures, operations, or processes consistent with the disclosed techniques. For example, memory 223 may include a resource identifier registry program 225 that may be used for registering speaker identity to resource pairings, a resource identifier resolution program 226 that may be used for retrieving a resource based on a speaker identity, and a resolution statistics compiler program 227 that may be used for building user profiles based on historical data generated by performing the techniques disclosed herein such as, for example, data generated by past user and/or user device resource requests. Memory 223 may also be configured with an operating system (not shown) that performs several functions well known in the art when executed by processor 222.

Resolution server 220 may include one or more I/O devices (not shown) that allow data to be received and/or transmitted by resolution server 220. I/O devices may include one or more digital and/or analog communication I/O devices that allow resolution server 220 to communicate with other machines and devices. The configuration and number of input and/or output devices incorporated in I/O devices may vary as appropriate for certain embodiments.

Resolution server 220 may also be communicatively connected to one or more data repositories 228. Data repository 228 may include one or more files, or one or more relational and/or non-relational databases that store information that may be accessed and/or managed by resolution server 220. The databases or other files may include, for example, data and information related to speaker identity to resource pairings as well as user profile data.

As shown in FIG. 2, audio provider 230 may include, for example, at least one processor 231 configured to execute computer program instructions to perform various processes and methods, at least one memory device 232 configured to access and store information and computer program instructions, I/O devices 233, databases 234 to store tables, lists, or other data structures, interfaces 235, and antennas 236.

As also shown in FIG. 2, user device 240 may include, for example, at least one processor 241 configured to execute computer program instructions to perform various processes and methods, at least one memory device 242 configured to access and store information and computer program instructions such as, for example, a speaker identification program 247; I/O devices 243; databases 244 to store tables, lists, or other data structures; interfaces 245; and antennas 246. Although not shown, user device 240 may also include one or more programs configured to access network 210, and display information received via network 210 via a browser, such as a web browser, or other computer program.

Speaker recognition program 247 may recognize and identify the speaker in the audio stream. Certain embodiments may implement speaker identification program 247 with hardware circuitry or with software or firmware stored within memory 242 in user device 240 and executed by processor 241. In embodiments where speaker identification program 247 is implemented as software, speaker recognition system 247 may be a standalone software application that may be used alone or in combination with other software applications, or it may instead be a component of a larger software application. In some embodiments, speaker identification software 247 may identify a speaker in an input audio stream based on a speaker voiceprint and convert the speaker identity into text for transmission to another entity such as, for example, resolution server 220 or resource provider server 250.

In some embodiments, speaker identification program 247 may be activated and deactivated automatically. For example, speaker identification program 247 may be automatically activated upon receiving audio input via a microphone and automatically deactivated once the audio input stops. Additionally or alternatively, in other embodiments, speaker identification program 247 may be activated or deactivated by a user of user device 240. In yet another embodiment, speaker identification program 247 may be continuously active.

Resource provider server 250 may include, for example, a processor 251, memory 252, I/O devices (not shown), storage 254, and a data repository 255. Resource provider server 250 may be implemented in various ways. For example, resource provider server 250 may be a general purpose computer, a server, a mainframe computer, or any combination of these components. Resource provider server 250 may communicate with components shown or not shown in system 200 via network 210. Resource provider server 250 may be standalone or it may be part of a subsystem, which may, in turn, be part of a larger system, such as a legacy domain registration system.

Storage 254 may be, include, or be part of one or more storage devices configured to store information used by processor 251 to perform certain functions related to the disclosed embodiments. For example, storage 254 may include a volatile or non-volatile, magnetic, semiconductor, tape, optical, removable, non-removable, or other type of storage device or computer-readable media.

In one embodiment, memory 252 may include one or more programs or subprograms (e.g., a web application or service) 253 loaded from storage 254 or elsewhere that, when executed by processor 251, perform various procedures, operations, or processes consistent with embodiments of the disclosed techniques. For example, web application or service 253 may be configured to register speaker identity to resource pairings, identify resources based on provided speaker identity, and/or build user profiles based on historical data generated by performing the techniques disclosed herein such as, for example, data generated by past user and/or user device resource requests. Memory 252 may be also be configured with an operating system (not shown) that performs several functions well known in the art when executed by resource provider server 250.

Resource provider server 250 may include one or more I/O devices (not shown) that allow data to be received and/or transmitted by resource provider server 250. I/O devices may include one or more digital and/or analog communication input/output devices that allow resource provider server 250 to communicate with other machines and devices. Resource provider server 250 may receive data from external machines and devices and output data to external machines and devices via I/O devices. The configuration and number of input and/or output devices incorporated in I/O devices may vary as appropriate for certain embodiments.

Resource provider server 250 may also be communicatively connected to one or more data repositories 255. Data repository 255 may include one or more files or relational and/or non-relational databases that store information and may be accessed and/or managed by resource provider server 250. The databases or other files may include, for example, data and information related to speaker identity-resource pairings as well as user profile data.

Figure 3:
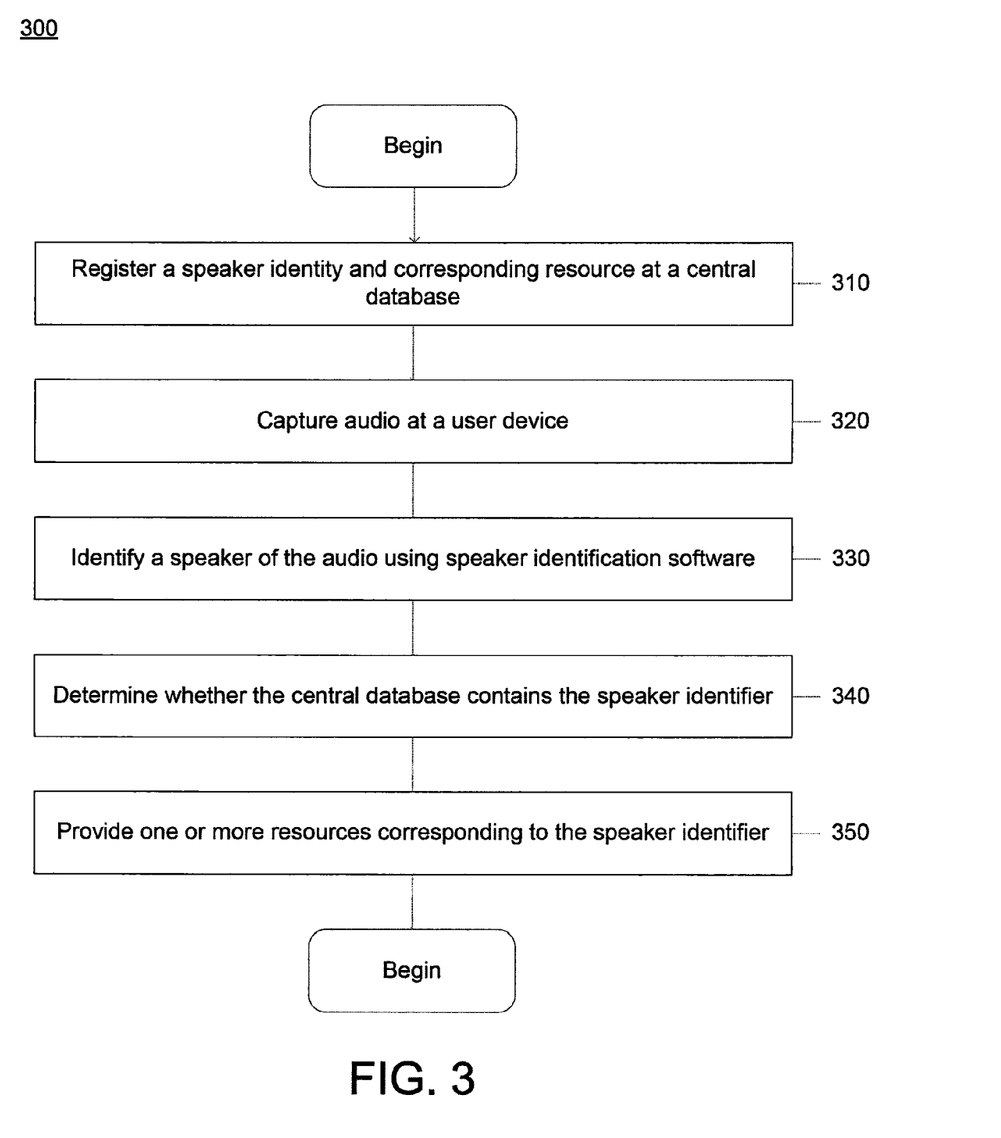
FIG. 3 is a flow diagram illustrating processes that may be used with certain embodiments of the techniques to provide resources based on an identified speaker.

Referring now to FIG. 3, shown is flow chart 300 illustrating embodiments of the techniques described herein for providing resource access for user devices. In step 310, a speaker identity resource (e.g., a name-resource pairing, a voiceprint-resource pairing, a name-resource pairing for a particular keyword or phrase, a voiceprint-resource pairing for a particular keyword or phrase, etc.) a may be registered at a central database and/or other registries such as, for example, resolution server 220 or resource provider server 250 of FIG. 2, in response to a registration request. In some embodiments, a registration request may be made by various types of devices or entities, including, for example, one or more individuals, one or more computer systems, or a resource provider such as a retailer, a marketer, or any other type of organization. As a specific example, a registration request may be made by an entity broadcasting or publishing advertisements.

In some embodiments, any speaker identity may be registered with a corresponding resource. However, other embodiments may allow registration only if the speaker is associated with the resource. For example, a speaker identity of say an actor may be registered with a related corresponding resource such as a link to the actor's website. However, the same speaker identity may not be registered with an unrelated resource such as a link to a different actor's website. In some embodiments, a speaker identity may correspond to multiple resources and/or a resource may correspond to multiple speaker identities.

In certain embodiments, a resource may provide a user further details about content being consumed by the user. A resource may also or alternatively facilitate a marketing or public service campaign. For example, in some embodiments, a resource may be, or be provided via one or more of the following: an internet protocol (IP) address or other network address, a hostname or domain name, a Uniform Resource Identifier (URI), a Uniform Resource Number (URN), a URL, a phone number, an email address, a text message, an image file, a Short Message Service (SMS) location, or a Multimedia Message Service (MMS) location. Other example resources may include Media Access Control (MAC) addresses, Ethernet Hardware Address (EHA) addresses, Bluetooth addresses, an International Mobile Subscriber Identity (IMSI), a subscriber identity module or subscriber identification module (SIM), a Removable User Identity Module (R-UIM), an Internet eXchange (IPX), X.25, BLNA, or a Global Positioning System (GPS) coordinate.

In some embodiments, a resource may be a link to, or in the form of, an electronic file, an electronic folder, or another item stored on the user device or external to the user device such as, for example, on an external storage device or server (e.g., resolution server 220 of FIG. 2). For example, an application executing on a device may retrieve a discount coupon that was previously stored on the user device (e.g., in the form of an image file) in response to the identification of a speaker's voiceprint in the audio stream played in a store. As a similar example, the discount coupon may be stored in resolution server 220 of FIG. 2 and communicated to the user device and/or a user of the user device in response to the identification of a speaker's voiceprint in the audio stream played in a store.

As another example of a resource, in a case where a user's device is not connected to the internet, such as when a user's mobile device is not subscribed to a data plan, the user device may be directed to call a pre-configured phone number. For example, a software application on the user device may communicate with one or more central databases or registries via SMS or MMS after which a response from the central database may prompt the user of the user device to call a phone number provided by the central database.

A resource may also comprise an action in some embodiments. For example, a resource may include instructions for directing a user device, or an application or other component executing or residing on the user device, to perform actions such as receiving email, forwarding or sending email, deleting email, exchanging email, using other messaging protocols, such as, Post Office Protocol (POP), Internet Message Access Protocol (IMAP), Simple Mail Transfer Protocol (SMTP), or otherwise manipulating email or other messages, whether occurring in the link layer, internet layer, transport layer, or application layer. As other examples, an action may comprise directing a web browser or application executing on a user device to a particular website, displaying text, an image, or a video on a user device, directing a television to a particular channel, executing a particular application on a user device, playing sound on a user device, or any other action capable of being performed on a user device. It should be noted that actions, as well as other resources, may vary with different user devices.

In yet other embodiments, a resource may, for example, specify indices or pointers to a separate database that contains further information about how to access a resource. In some embodiments, the indices may be single or multi-bit indices into separate databases. In other embodiments, the indices may be unique data strings that serve as indices into separate databases. A separate database may be provided by third-party resolution service providers or resolution servers. In still other embodiments, a resource may be determined using a computer algorithm or logic that, for example, is capable of execution on the user device as particular software installed on the user device in the form of an application, widget, or native software.

In some embodiments, resources may be edited after registration. Editing may include, for example, changing a resource. In certain embodiments, changes can be made manually by a registering entity or automatically based on a computer algorithm or logic.

Referring still to FIG. 3, in step 320, audio may be captured at a user device. For example, in some embodiments, audio may be transmitted in a region and captured by a user device such as user device 240 of FIG. 2, which may be, for example, a cellular telephone, smart phone, or other user device having a microphone or other input means to capture audio. In step 330, speaker recognition software may be used to identify speaker in the captured audio. In some embodiments, as mentioned above with reference to speaker recognition system 247 of FIG. 2, speaker recognition software may automatically identify speaker upon receipt of the audio at a user device. In other embodiments, a user may activate a software application on a user device to identify speaker in the captured audio using a speaker recognition system. For example, a user watching a television broadcast may activate an application on a user device for the purpose of obtaining additional information about the content of the broadcast. In some embodiments, the audio may be extracted directly from the broadcast signal.

As a specific example, a user may activate an application on a user device such as a smart phone, personal computer, or other similar user device by entering a predefined sequence (e.g., #555) or actuating a button on the user device. As another example, the user may be informed of the presence of audio such as by announcements on a television channel the user is watching, signs or announcements in a location such as a shopping mall or airport, by the user device itself, or via any other suitable mechanism, thereby notifying the user to activate a speaker recognition system. Alternatively, a user device may be operated in a monitoring mode, enabling the automatic activation of a speaker recognition system upon detection of audio. In another embodiment, there may be one or more cues (e.g., an audible or inaudible sound cue, an image or video cue, an electronic communication—such as SMS, e-mail, instant message, a proprietary notification system, etc.—from another program on the user device or a different computer or network, etc.) to activate the speaker recognition system.

In step 340, it may be determined whether the central database contains speaker identifier that corresponds to the identified speaker. In some embodiments, an application on the user device may query an internal database to determine whether one or more identified speakers have one or more speaker identifiers. In other embodiments, the user device may transmit one or more speaker identifiers to a central database such as, for example, resolution server 220 or resource provider server 250 of FIG. 2. In some embodiments, identified speaker identifiers may be continuously transmitted to the central database. In other embodiments, identified speaker identifiers may be transmitted in accordance with a predefined time interval. In certain embodiments, identified speaker identifiers may be used to initiate the execution of an application, program, or action on a device without determining whether a database contains corresponding speaker identifiers. It should be noted that some or all of these embodiments may internally and/or externally store identified speaker identifiers for later processing.

Based on the determination, in step 350 one or more resources corresponding to contained speaker identifiers may be provided to the user device. In some embodiments, resources are provided to the user on a user device in a selectable format such as, for example, in a selectable textual and/or graphical listing of network links. For instance, an application on a user device initiated by a user, or automatically initiated upon receipt of audio at the user device, may display provided resources for selection by the user. As a specific example, provided resources may consist of one or more selectable advertisement offers that are graphically displayed to the user on the user device. Selecting one of the advertisement offers may, for example, direct a web browser executing on the user device to a website at which the offer may be fulfilled. In other embodiments, as described above, a resource may cause a user device to perform a specific action such as, for example, initiating an application, causing an application to perform a specific action, sending an email, calling a telephone number, displaying text, an image, or a video, or directing a web browser executing on the user device to a specific website. In yet another embodiment, a resource may be automatically or manually bookmarked for later use or review by a user. In one embodiment, the speaker identifier and/or any metadata on the user device or resolution server may be used as search terms against third-party databases or indexes (e.g., a search engine, etc.) and that the results of the search may be processed by a browser or other program on the user device or resolution server.

In particular embodiments of the techniques described herein, a user device may request user confirmation prior to initiating an action and/or may provide options for how the user would prefer to take various actions such as, for example, accessing a website. In some embodiments, resource requests may include derived geographical location information to ensure a location-appropriate resource. For instance, when the geographical location of a user device is considered, a provided resource may, for example, relate to the location of facilities nearest to the requesting user device or include a web page in a language corresponding to the geographical location of the user.

In some embodiments of the techniques described herein, resources provided to particular user devices, and a user's interaction with those resources, may be tracked in order to build profiles that can be used to better target information to users. For example, in certain embodiments, resource request information may be recorded by a central database or registry by noting, for example, the requesting user device, user information, the speaker identifier, and information related to the resource provided to the user device. In these embodiments, an analysis may be performed on the recorded data to analyze individual and/or aggregate profile information in order to provide tailored information to the user. Also, in some embodiments, the central database, or software or hardware on a user device or any other device, may collect details regarding a user's activities, which may be used to enable the central database or registry to, for example, determine content consumption habits of the user, help advertisers better target commercials and other content to the user, develop customized resources for the user, as well as perform other similar functions.

Because use of the techniques described herein may result in users being seamlessly directed to a destination, an application with malicious intent or a legitimate application with compromised security may redirect a user to a nefarious destination thus potentially instigating fraud. Therefore, some embodiments of the techniques described herein may utilize, for example, cryptographic certificates that check for the authenticity and security of the destination resource with a database. Other mechanisms for verifying the authenticity and/or security of a destination resource may instead or also be used.

Figure 4:
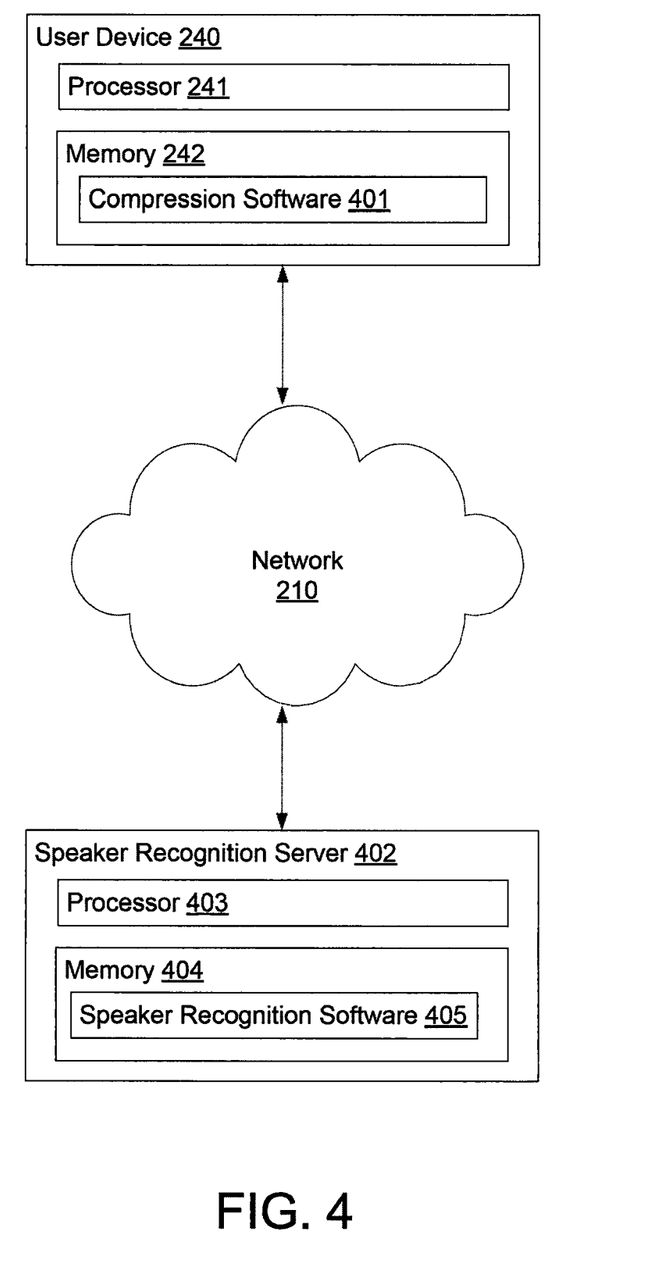
FIG. 4 illustrates a system that may be used with certain embodiments of the techniques to provide resources based on an identified speaker.

FIG. 4 discloses another system consistent with an embodiment of this disclosure. In this embodiment, user device 240 may still include the previously discussed processor 241 and memory 242. However, in this embodiment memory 242 may, instead of including speaker identification software 247, include signal processing software 401. Signal processing software 401 may convert an audio signal, or a portion of the audio signal, received or captured by user device 240 into a representation. The representation may be a compressed representation, an algorithmic representation, a mathematical representation, a sample, and/or a digest of the audio signal or the portion of the audio signal. Then, the representation may be transmitted over network 210 to a speaker recognition server 402. In certain embodiments, the speaker recognition server 402 may be one or more of resolution server 220 or resource provider server 250. The speaker recognition server 402 may be any device that includes a processor 403 and a memory 404. The speaker recognition server 402 may receive the compressed audio signal, or portion of the audio signal, and process it using speaker recognition software 405.

The speaker recognition software 405 may then determine an identity of the speaker in the audio signal, or portion of the audio signal. The speaker recognition server 402 may then provide the speaker identity to the user device 240 or directly to the resolution server 220.

What follows are examples in accordance with certain embodiments of the disclosed techniques. The examples are provided merely as illustrations and are not intended to limit the disclosed techniques.

Broadcast Program Example: In one example, a user watching a television broadcast, such as of a sporting event, may desire statistics for various players or teams participating in the sporting event. The user may activate an application utilizing the techniques described herein on a user device such as, for example, a mobile telephone, a computer, television, or other electronic user device for the purpose of receiving such statistics. The user device may capture audio from the television broadcast and the application may use a speaker recognition system to identify speakers in the captured audio. For example, the user device may capture audio and identify the speaker to be "Timmy Smith." The application may send a speaker identifier (e.g., a speaker name, etc.) to a central registry, such as a VERISIGN™ registry. The central registry may then determine whether any speaker identifier to resource mappings exist that correspond to the speaker identifier and return any resources associated with the speaker identifier to the user device. For example, if the user device captures the speaker name "Timmy Smith" and sends those words to the central database, the central database may determine if a speaker name equal to the name "Timmy Smith" exists, and if so, returns the corresponding resource to the user device, which may be, for example, the URL "http://www.timmysmith.com." The URL may be displayed to the user of the user device as a selectable link that when selected by the user results in the loading of a website that includes the desired statistics of the player in a web browser.

Advertising Campaign Example: As another example, a marketing company may register one or more speaker identity-resource pairings for a particular product or group of products. A consumer listening to a commercial that is transmitted via broadcast or other media transmission may be provided a resource, e.g., a web page or website, by activating an application on their phone that identifies a speaker in the commercial broadcast using a speaker identification system and that requests a resource from a central database based on the identified speaker. In some embodiments, all commercials for a particular product or group of products may include the same registered speaker identifier and, thus, the user may be directed to a common webpage regardless of which of the commercials for the particular product or group of products is broadcast to the users. In other embodiments, each individual commercial for a particular product or group of products may include a different speaker and the user may be directed to either a common webpage or different webpages for each commercial based on the different speaker identifiers.

Geographical Location Advertising Example: For a user device enabled to derive geographical location information, a speaker identifier may be used in connection with geographical location information to determine a resource appropriate for the vicinity of the requesting user device. That is, while in some cases a speaker identifier may result in the same resource being returned to all user devices from a resolution server irrespective of location, in other cases each user device may receive a resource appropriate for the vicinity of the user device from a resolution server by providing not only speaker identifiers that correspond to identified speakers captured by the user device, but also the user device's current geographic location. Accordingly, the resolution server may provide different resources to requesting user devices located in different geographical locations.

Promotional Codes Example: As another example, a speaker identifier may be paired with a promotional code resource. For example, a user device may capture an advertising "jingle." An application on the user device may identify speakers in the jingle and request a resource from a resolution server based on those speaker identifiers. The resolution server may return the associated promotional code to the user device via a hyperlink displayed to the user on the user device. The user, in turn, may access a web page and may use the promotional code at the time of check-out in an e-commerce transaction to avail him/herself of discounts. As a specific example, a DISNEY™ advertisement may comprise audio that corresponds to a speaker-resource pairing, with the speaker being "Mickey Mouse" and the resource being one or more promotional codes. The user device, upon identifying the speaker "Mickey Mouse" and requesting any possible resources corresponding to the speaker may receive a promotional code. For example, a promotional code may be received that allows a customer to purchase tickets to DISNEYLAND™ at a discounted price.

Automatic Contest Registry and/or Voting Example: As still another example, a speaker may be associated with a resource hosting an online and/or broadcast contest. For example, a user may be provided with a means to cast votes for favorite contestants in television or other broadcast shows, such as, for example, AMERICAN IDOL™, AMERICA'S GOT TALENTT™, or the like, in response to one or more speakers identified in the shows that correspond to a speaker-resource pairing.

Radio Example: A user listening to a breaking news broadcast may want more details on the topic of the news report. To do so, the user may activate an application that utilizes the techniques described herein to capture audio. The application may be directed to a webpage or other resource that provides additional details about the news story based on identified speakers in the captured audio.

Additional Audio Signal Information Example: In one embodiment, the speaker information may be registered with additional audio signal information. The additional audio signal information may comprise, for example, one or more identifiers derived by processing the audio stream, such as audio fingerprints, audio watermarks, text from the audio signal, audio URLs, or any other identifier derived from the audio signal. More information on the use of audio URLs can be found in co-pending Patent Application Publication No. 2011/0238192 to Systems and Methods for Providing Access to Resources Through Enhanced Audio Signals, filed on Mar. 25, 2011, which is incorporated by reference in its entirety.

In this embodiment, user device may receive an audio signal, as discussed above. The user may than determine a speaker identity for the audio signal using one or more of the embodiments discussed above. In this embodiment, however, the user device may also determine additional information for the audio signal. Alternatively, the audio signal may be sent to a server to have the additional information determined. The user device or server may determine the additional information by matching one or more audio fingerprints, extracting one or more audio watermarks, or performing speech-to-text translation on the audio signal. Then, the user device or server may provide the additional information and the speaker identity to the registry, which then provides a resource (or access information for the resource) registered for that combination of additional information and speaker identity.

The foregoing description of the techniques, along with associated embodiments, has been presented for purposes of illustration only. It is not exhaustive and does not limit the techniques to the precise form disclosed. Those skilled in the art will appreciate from the foregoing description that modifications and variations are possible in light of the above teachings or may be acquired from practicing the techniques. For example, the steps described need not be performed in the same sequence discussed or with the same degree of separation. Likewise, various steps may be omitted, repeated, or combined, as necessary, to achieve the same or similar objectives. Accordingly, the spirit and scope of the techniques described herein should be limited only by the following claims.

What is claimed is:

1. A computer system for providing audio-activated resource access for user devices, the computer system comprising:
   a processor; and
   a memory coupled to the processor, the memory storing instructions to cause the processor to perform operations comprising:
   capturing audio at a user device;
   determining a geographic location of the user device;

loading a speaker recognition program from a non-volatile computer-readable medium on the user device;
analyzing the audio that is captured by the speaker recognition program;
determining an identity of speaker that produced the audio based on a speaker voiceprint;
transmitting, over a network, an identifier of the speaker of the captured audio identified by the speaker recognition program and the geographic location of the user device to a resource provider server system that is separate from the speaker recognition program to determine a corresponding geographic specific resource based on the geographic location of the user device and a pre-registered speaker identity to resource pairing identifier stored at the resource provider server system;
receiving the corresponding geographic specific resource from the resource provider server system, wherein the corresponding geographic specific resource comprises at least one of a Uniform Resource Locator (URL), a Uniform Resource Identifier (URI), a Uniform Resource Number (URN), a domain name, or an Internet Protocol (IP) address, a hostname, Media Access Control (MAC) addresses, Ethernet Hardware Address (EHA) addresses, Bluetooth addresses, an International Mobile Subscriber Identity (IMSI), a subscriber identity module, subscriber identification module (SIM), a Removable User Identity Module (R-UIM), an Internet eXchange (IPX), or X.25, BLNA; and
activating, by the processor, an application to cause a web browser to navigate to a web page based on the corresponding geographic specific resource that is based on the pre-registered speaker identity to resource pairing identifier.

2. The computer system of claim 1, wherein capturing audio comprises capturing audio from a microphone of the user device.

3. The computer system of claim 1, wherein capturing audio comprises capturing human-comprehensible audio.

4. The computer system of claim 1, wherein the speaker recognition program comprises speaker recognition technology.

5. The computer system of claim 1, wherein the user device is a mobile phone.

6. The computer system of claim 1, wherein the resource provider server system identifies speaker-resource pairings registered by an entity.

7. The computer system of claim 1, wherein receiving the corresponding geographic specific resource causes downloading the webpage associated with the corresponding geographic specific resource.

8. The computer system of claim 1, wherein the corresponding geographic specific resource comprises the action.

9. The computer system of claim 1, wherein transmitting an identifier of a speaker of the captured audio comprises transmitting a speaker name.

10. The computer system of claim 1, wherein the operations further comprise transmitting additional information for the captured audio to the resource provider server system, wherein the corresponding geographic specific resource is determined based on the additional information and the speaker identity.

11. A resource provider system for providing audio-activated resource access for user devices, the system comprising:

a processor; and
a memory coupled to the processor, the memory storing instructions to cause the processor to perform operations comprising:
receiving a request from a first device to register a speaker-resource pairing;
registering the pairing in a database in communication with the resource provider system;
receiving a request from a second device for a geographic specific resource corresponding to at least one speaker included in the request from the second device;
determining a geographic location of the second device;
determining that a speaker-resource pairing exists in the database based on the at least one speaker; and
transmitting at least one geographic specific resource to the second device, wherein the at least one geographic specific resource is based on the geographic location of the user device and comprises at least one of a Uniform Resource Locator (URL), a Uniform Resource Identifier (URI), a Uniform Resource Number (URN), a domain name, or an Internet Protocol (IP) address, a hostname, a Multimedia Message Service (MMS) location, Media Access Control (MAC) addresses, Ethernet Hardware Address (EHA) addresses, Bluetooth addresses, an International Mobile Subscriber Identity (IMSI), a subscriber identity module, subscriber identification module (SIM), a Removable User Identity Module (R-UIM), an Internet eXchange (IPX), X.25, or BLNA,
whereby the transmitting causes an application on the second device to cause a web browser to navigate to a web page based on the corresponding geographic specific resource that is based on the pre-registered speaker identity to resource pairing identifier.

12. A method for providing audio-activated resource access for user devices, the method comprising:
capturing audio at a user device;
determining a geographic location of the user device;
loading a speaker recognition program from a non-volatile computer-readable medium on the user device;
analyzing the audio that is captured by the speaker recognition program
determining an identity of speaker that produced the audio based on a speaker voiceprint;
transmitting an identifier of the speaker of the captured audio identified by the speaker recognition program and the geographic location of the user device to a resource provider server system that is separate from the speaker recognition program to determine a corresponding geographic specific resource that is based on the geographic location of the user device and a pre-registered speaker identity to resource pairing identifier stored at the resource provider server system;
receiving the corresponding geographic specific resource from the resource provider server system, wherein the corresponding geographic specific resource comprises at least one of a Uniform Resource Locator (URL), a Uniform Resource Identifier (URI), a Uniform Resource Number (URN), a domain name, or an Internet Protocol (IP) address, a hostname, a text message, Media Access Control (MAC) addresses, Ethernet Hardware Address (EHA) addresses, Bluetooth addresses, an International Mobile Subscriber Identity (IMSI), a subscriber identity module, subscriber identification module (SIM), a Removable User Identity Module (R-UIM), an Internet eXchange (IPX), X.25, or BLNA; and activating, by the processor, an application to cause a web browser to navigate to a web page based on the corresponding geographic specific resource that is based on the pre-registered speaker identity to resource pairing identifier.

13. The method of claim 12, wherein capturing audio comprises capturing human-comprehensible audio.

14. The method of claim 12, wherein the speaker recognition program comprises speaker recognition technology.

15. The method of claim 12, wherein the resource provider server system identifies speaker-resource pairings registered by an entity.

16. The method of claim 12, wherein the corresponding geographic specific resource comprises the action.

17. A method for providing audio-activated resource access for user devices, the method comprising:
  receiving, at a resource provider system, a request from a first device to register a speaker resource pairing;
  registering, at the resource provider system, the pairing in a database in communication with the resource provider system;
  receiving, at the resource provider system, a request from a second device for a resource corresponding to at least one speaker included in the request from the second device;
  determining geographic location of the second device;
  determining that a speaker-resource pairing exists in the database based on the at least one speaker; and
  transmitting, by the resource provider system, at least one geographic specific resource to the second device, wherein the at least one geographic specific resource is based on the geographic location of the user device and comprises at least one of a Uniform Resource Locator (URL), a Uniform Resource Identifier (URI), a Uniform Resource Number (URN), a domain name, or an Internet Protocol (IP) address, a hostname, a text message, Media Access Control (MAC) addresses, Ethernet Hardware Address (EHA) addresses, Bluetooth addresses, an International Mobile Subscriber Identity (IMSI), a subscriber identity module, subscriber identification module (SIM), a Removable User Identity Module (R-UIM), an Internet eXchange (IPX), X.25, or BLNA,
  whereby the transmitting causes an application on the second device to cause a web browser to navigate to a web page based on the corresponding geographic specific resource that is based on the pre-registered speaker identity to resource pairing identifier.

18. A non-transitory computer-readable medium storing a set of instructions that, when executed by a processor, perform a method for providing audio-activated resource access for user devices, the method comprising:
  receiving, at a resource provider system, a request from a first device to register a speaker resource pairing;
  registering, at the resource provider system, the pairing in a database in communication with the resource provider system;
  receiving, at the resource provider system, a request from a second device for a geographic specific resource corresponding to at least one speaker included in the request from the second device;
  determining geographic location of the second device;
  determining that a speaker-resource pairing exists in the database based on the at least one speaker; and
  transmitting, by the resource provider system, at least one geographic specific resource to the second device, wherein the at least one geographic specific resource is based on the geographic location of the user device and comprises at least one of a Uniform Resource Locator (URL), a Uniform Resource Identifier (URI), a Uniform Resource Number (URN), a domain name, or an Internet Protocol (IP) address, a hostname, a text message, Media Access Control (MAC) addresses, Ethernet Hardware Address (EHA) addresses, Bluetooth addresses, an International Mobile Subscriber Identity (IMSI), a subscriber identity module, subscriber identification module (SIM), a Removable User Identity Module (R-UIM), an Internet eXchange (IPX), X.25, or BLNA,
  whereby the transmitting causes an application on the second device to cause a web browser to navigate to a web page based on the corresponding geographic specific resource that is based on the pre-registered speaker identity to resource pairing identifier.

19. The computer system of claim 1, wherein receiving the corresponding geographic specific resource causes storing data associated with the corresponding resource.

* * * * *